(12) United States Patent
Guo

(10) Patent No.: US 9,078,274 B2
(45) Date of Patent: Jul. 7, 2015

(54) DETERMINATION DEVICE AND METHOD FOR NETWORK RESOURCE USAGE

(71) Applicant: Sony Corporation, Minato-ku (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 14/029,974

(22) Filed: Sep. 18, 2013

(65) Prior Publication Data

US 2014/0087777 A1     Mar. 27, 2014

(30) Foreign Application Priority Data

Sep. 26, 2012    (CN) .......................... 2012 1 0364600

(51) Int. Cl.
     *H04W 72/00*      (2009.01)
     *H04W 72/10*      (2009.01)
     *H04L 12/911*     (2013.01)
     *H04L 27/00*      (2006.01)
     *H04W 72/12*      (2009.01)
     *H04W 16/14*      (2009.01)

(52) U.S. Cl.
CPC ............. *H04W 72/10* (2013.01); *H04L 47/823* (2013.01); *H04L 27/0006* (2013.01); *H04W 72/1247* (2013.01); *H04W 16/14* (2013.01)

(58) Field of Classification Search
USPC ........... 455/422.1, 450–453, 456.2, 464, 509, 455/510; 370/395.41, 332; 375/E7.141
See application file for complete search history.

(56) References Cited

U.S. PATENT DOCUMENTS

| | | | |
|---|---|---|---|
| 7,746,789 B2 * | 6/2010 | Katoh et al. .................. 370/238 |
| 7,912,472 B2 * | 3/2011 | Beziot et al. .................. 455/450 |
| 8,798,088 B1 * | 8/2014 | Shetty et al. .................. 370/437 |
| 2005/0171834 A1 * | 8/2005 | Yokota et al. .................... 705/10 |
| 2006/0120282 A1 | 6/2006 | Carlson et al. |
| 2007/0153801 A1 | 7/2007 | Sung et al. |
| 2008/0159136 A1 | 7/2008 | Mallesan |
| 2008/0215675 A1 * | 9/2008 | Kaminitz et al. ............. 709/203 |
| 2010/0005505 A1 * | 1/2010 | Gottimukkala et al. .......... 726/1 |
| 2010/0322074 A1 | 12/2010 | Nakahira et al. |
| 2012/0142319 A1 * | 6/2012 | Joshi et al. ................. 455/414.1 |

* cited by examiner

*Primary Examiner* — Dominic E Rego
(74) *Attorney, Agent, or Firm* — Oblon, McClelland, Maier & Neustadt, L.L.P.

(57) ABSTRACT

The invention discloses a determination device and method for network resource usage. The device includes a management module used for storing and updating transformation situations of use statuses of the network resources of a primary user, wherein the transformation situations comprise each of a plurality of use statuses of the network resources transforming to other use status; and a determination module used for predicting a use status of the network resources of the primary user in current period in accordance with a use status of the network resources of the primary user in a period prior to the current period and other use status transformed from the use status in the period prior to the current period in the transformation situations under the condition of predicting the resources in the current period, and determining network resources which may be used by a secondary user in the current period depending on the predicted use status in the current period. The invention may predict the use statuses of the network resources of the primary user in the current period reasonably, thereby decreasing the time of sensing and overcoming the hysteresis of the secondary user for using the resources.

16 Claims, 8 Drawing Sheets

DETERMINATION DEVICE AND METHOD FOR NETWORK RESOURCE USAGE

FIELD OF THE INVENTION

The invention relates to the communication field, more particularly to a determination device and method for network resource usage.

BACKGROUND OF THE INVENTION

As demands for wireless multimedia services of users increase, the limited wireless resources are more important, thereby promoting the rapid development of more reasonable and efficient utilization of wireless resources in communication techniques. However, there is a difficulty that licensed spectrums cannot be used completely by primary users (wireless users qualified to use the licensed spectrums) due to a presenting existing fixed spectrum allocation strategy. In this case, there appears a concept of cognitive radio. The cognitive radio enables secondary users (i.e. wireless users not qualified to use the licensed spectrums) to find out more available spectrum resources by their interactions with wireless environments and to dynamically change operation parameters of the wireless environments to effectively utilize these resources, with influences on the primary users in a restriction scope.

A cognitive radio network comprises a primary network comprising a primary user (PU) and a primary base station (PBS) and a secondary network comprising a secondary user (SU) and a secondary base station (SBS).

The PU is authorized to use network resources, for example, the licensed spectrums in the networks, by the coordination of the PBS. The transmissions of primary network nodes (including the PU and the PBS) are subjected to zero interference of signals of secondary network nodes (including the SU and the SBS) or allowable interferences. Due to no cognitive radio function provided for the primary network nodes, it is to be ensured that the primary network nodes can be operated normally in no awareness of existence of the secondary network.

The secondary network may use the network resources of the primary network, for example, the licensed spectrums, when and only when the influences of the signals of the secondary network nodes on the primary network nodes are restricted in a scope. The spectrums using of the SU are controlled by the SBS generally. The secondary network nodes have the cognitive radio functions including spectrum sensing and analysis, spectrum management and switching, and spectrum allocation and sharing. The cognitive radio network may comprise one or more secondary networks where communication between the SU and the SBS may be implemented. A spectrum coordinator (SC) is used for management generally in the case that a plurality of secondary networks may share the spectrums. The SC collects operation information of each secondary network and provides resource allocation in order to realize efficient and fair resource sharing among the secondary networks. There is no direct information interaction between the primary network and the secondary network for improving the flexibility of the secondary network and the convenience of layout thereof. The secondary network nodes sense, detect and monitor the licensed spectrums to adjust the resources used thereby and the related system configurations, thus sharing the resources without influences on the primary network nodes.

The SU has an opportunistic feature for using the licensed spectrums so that the wireless resources are classified in a transmission opportunity (TO). The TO is a subset of primary system resources and may comprise one or more than one allocation units of the primary system resources, for example, a TO in a frequency division multiple access (FDMA) network corresponds to one or one group of frequency bands, a TO in a time division multiple access (TDMA) network corresponds to one or one group of time slots; and a TO in an orthogonal frequency division multiplexing (OFDM) network corresponds to one or one group of resource blocks (RB). The allocation of the licensed spectrums to the SU depends on a mode of using the licensed spectrums by the primary network, specifically, whether each TO may be used by the PU, which is referred to resource use status information of the primary network (called a primary network status or network status for short).

There is a challenge for the cognitive radio that the use mode of the licensed spectrums is complicatedly random for the SU due to lack of spectrum allocation information of the PU so that it is hard for the SU to effectively allocate the licensed spectrums.

Solutions concerning ensuring the SU in the network may use the network resources without influences on the PU have been provided. However, those solutions involve optimization of spectrum allocation and also determination of the way to use the network resources based on the fact that the PU has used resources. Those solutions are performed after the resources have been allocated to the PU; and the spectrums are optimized with the aid of a complex algorithm, accordingly, it will take a longer time to determine which network resources the SU may use so as to latterly allocate the resources, so that the TOs of valid data by a secondary system using the licensed spectrums are decreased, and hence it is hard to improve the use efficiency of the licensed spectrums.

Further provided is a solution comprising an information storage and management method which is taken to record statistic data of network operation statuses and a statistics-based resource allocation method where statistic information that the licensed spectrums are used by the PU is utilized to guide the allocation of the licensed spectrums to the SU. However, in such solution, association of the use statuses of the licensed spectrums in a spatiotemporal pattern is neglected so that the availability of the licensed spectrums for the SU may not be predicted more accurately. Therefore, the time and overheads required for the sensing operation may increase in order to ensure the allowable interferences of the SU on the PU. This will reduce the TOs of the valid data by the secondary system using the licensed spectrums, thereby causing failure of improving the use efficiency of the licensed spectrums.

No effective solution is provided for solving the problems of hysteresis and inaccuracy in the related techniques when the way of the SU to use the network resources is determined.

DESCRIPTION OF THE INVENTION

The present invention provides a determination device and method for network resource usage with respect to the problems of hysteresis and inaccuracy in the related techniques when the way of the SU to use the network resources. The determination device and method for network resource usage may be used to reasonably predict the network resources may be used by the SU in the current period, thereby avoiding the resource allocation/request hysteresis.

A determination device for network resource usage according to one aspect of the invention is provided for realizing the above purpose, which is used for determining network resources may be used by the SU in the cognitive radio network.

The determination device for network resource usage includes a management module and a determination module, wherein the management module is used for storing and updating transformation situations of use statuses of the network resources of the PU, and wherein the transformation situations comprise each of a plurality of use statuses of the network resources transforming to other use status; and the determination module is used for predicting a use status of the network resources of the PU in the current period in accordance with a use status of the network resources of the PU in a period prior to the current period and an other use status transformed from the use status in the period prior to the current period in the transformation situations under the condition of predicting the resources in the current period, and determining network resources which may be used by the SU in the current period depending on the predicted use status in the current period.

A determination method for network resource usage according to another aspect of the invention is provided, which is used for determining network resources may be used by the SU in the cognitive radio network.

The determination method for network resource usage comprises the following steps of storing and updating transformation situations of use statuses of the network resources of the PU, wherein the transformation situations comprise each of a plurality of use statuses of the network resources transforming to other use status; and predicting a use status of the network resources of the PU in the current period in accordance with a use status of the network resources of the PU in a period prior to the current period and other use status transformed from the use status in the period prior to the current period in the transformation situations under the condition of predicting the resources in the current period, and determining a network resource which may be used by the SU in the current period depending on the predicted use status in the current period.

A non-transient storage medium according to another aspect of the invention is provided, which is used for determining network resources may be used by the SU in the cognitive radio network.

Wherein the non-transient storage medium has embodied thereon a computer program configured to cause a processor to implement a determination technique for network resource usage, the computer program comprising code segments configured to cause a processor to:

storing and updating transformation situations of use statuses of the network resources of a primary user, wherein the transformation situations comprise each of the use statuses of the network resources transforming to other use status; and predicting a use status of the network resources of the primary user in current period in accordance with a use status of the network resources of the primary user in a period prior to the current period and other use status transformed from the use status in the period prior to the current period in the transformation situations under the condition of predicting the resources in the current period, and determining a network resource which may be used by a secondary user in the current period depending on the predicted use status in the current period.

In the present invention, the use statuses of the network resources of the PU and the transformation situations of the use statuses are saved, so that the use status of the network resources of the PU in the current period is predicted according to the use status in a period prior to the current period in the saved transformation situations of the use statuses so as to determine resources which may be used by the SU in the current period in advance and effectively reduce the sensing time for avoiding the interferences on the PU, thereby reasonably predicting and prejudging the resource allocation/request and overcoming the hysteresis of using the resources by the SU.

BRIEF DESCRIPTION OF THE DRAWINGS

The following detailed description to figures in the embodiments is made to illustrate the embodiments of the present invention or the technical solution in the prior art clearly. Obviously, the following figures are some embodiments of the present invention merely. Those skilled in the art may achieve other figures without creative works according to the figures.

FIG. 5b is a schematic diagram illustrating a primary network status after merging primary network statuses shown in FIG. 5a;

DETAILED DESCRIPTION OF ILLUSTRATIVE EMBODIMENTS

The following description for the illustrative embodiments of the invention is made in conjunction with the figures. Features of the actual embodiments are not described completely in the description for clarity and conciseness. It should be appreciated, however, that many decisions special to the embodiments must be made during the development of such actual embodiments in order to realize the specific goals of the developers, for example, these decisions include restriction conditions related to systems and services, which may be changed as the embodiments are different. In addition, it should be recognized that the development work may be complicated and time-consuming, but it is a routine task for those skilled in the art beneficial from the disclosure.

It is emphasized that device structures and/or processing steps related to the solution of the invention are illustrated merely in the figures in order to focus on the invention.

A determination device for network resource usage, which is used for determining network resources that may be used by a secondary user in a cognitive radio network, is provided according to embodiments of the invention.

Figure 1:
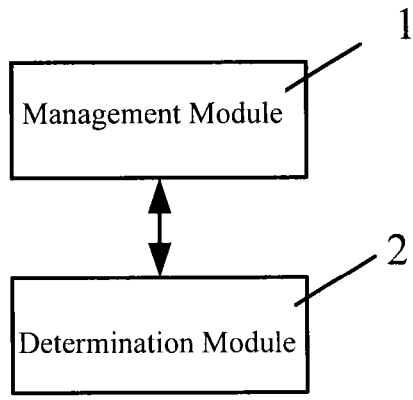
FIG. 1 is a block diagram illustrating a determination device for network resource usage according to one embodiment of the invention.

Refer to FIG. 1, a determination device for network resource usage according to one embodiment of the invention is provided, which is used for determining network resources which may be used by the SU in the cognitive radio network and includes a management module 1 and a determination module 2, wherein the management module 1 is used for storing and updating transformation situations of use statuses of the network resources of a PU, and wherein the transformation situations comprise each of a plurality of use statuses of the network resources transforming to other use status; and the determination module 2 is used for predicting a use status of the network resources of the PU in the current period in accordance with a use status of the network resources of the PU in a period prior to the current period and other use status transformed from the use status in the period prior to the current period in the transformation situations under the condition of predicting the resources in the current period, and determining network resources which may be used by the SU in the current period depending on the predicted use status in the current period. The network resources may be used by the SU in the current period, determined by the determination module 2, which is referred to a determination result. The use status comprises a use condition of each transmission opportunity in the network resources by the primary user.

The management module 1 may save use statuses of the network resources of the PU occurred in multiple periods, and a transformation situation of the use status of the primary network resources occurred in a period next to each period.

The management module 1 also saves and updates the number of times of each status transforming to other use status and represents transformation situations of the use statuses of the network resources by establishing associations among the use statuses, wherein an association of each use status with another use status comprises transformations of each use status to the other use status and the number of times thereof.

And the management module further stores and updates the last status updating time of each use status. Based on the contents saved in the management module 1, the determination module 2 may predict resources used by the primary network in the current period in the following manners so as to determine resources which may be used by the SU in the current period. Specifically, with respect to the resource prediction in the current period, the determination module 2 may filter second use statuses associated with a first use status in the period prior to the current period in the saved transformation situations, wherein the second use statuses associated with the first use status refer to the second use statuses being transformed from the first use status. When the second use statuses are filtered, the second use statuses of which a degree of association is less than a preset threshold and/or which do not occur in a preset time period are filtered out, and then network resources allocated to the SU may be determined according to the remaining use statuses. The degree of association of the second use statuses with the first use status is less than the preset threshold, which means M transformations from the first use status to the second use statuses occur, and M is less than a preset degree of association threshold N, wherein M and N are natural numbers more than 1, a value of N may be determined based on the actual system scale, and those skilled in the art can determine the value of N according to the actual situation.

The determination module may predict the network resources which used by the PU in the current period in the above manners so as to determine which resources the SU may be used regardless of arrangement of the device of the invention at a SBS or a SU, or a third network node (for example, a spectrum coordinator) independent of the SBS and the SU. When the device is arranged at the SBS or the spectrum coordinator, the SBS or the spectrum coordinator may determine and allocate the resources, and the SBS may allocate resources to the SU according to a determination result determined by the determination module. When the device is arranged at the SU, the SU may use the resources initiatively independent of the resource allocation of the SBS according to a determination result determined by the determination module, meanwhile, SU terminal equipment may request resource according to the determination result determined by the determination module so as to avoid preferable request for the network resources which have already been predicted to probably allocate the PU. Furthermore, even though the determination device for network resource usage including the management module and the determination module is arranged at the SBS or the spectrum coordinator, an information interaction module included therein may inform the SU of the determination result, thus the SU may request resource or use according to the determination result from the determination module.

The determination device for network resource usage may be arranged at the base station, the spectrum coordinator, or the SU. One or more than one of the SBS, the spectrum coordinator and the SU may detect the use status of the primary network as needed. If the device is arranged at the base station or the spectrum coordinator, the device may dispatch other network nodes (for example, the SUs) in a task distribution manner, thereby detecting the primary network status by coordinative division. The device further includes:

A primary network status collection task setting module (not shown) used for allocating a network resource use status collection task to the SU such that the SU receiving the network resource use status collection task collects use statuses of the network resources of the PU. And the management module 1 acquires and stores a collection result from the SU.

The device further includes a primary network status collection module (not shown) which is used for collecting the use statuses of the network resources of the PU. And the management module is used for acquiring and storing a collection result from the primary network status collection module.

If the device is arranged at the SBS or the spectrum coordinator, and the SBS or the spectrum coordinator allocates the resources, the device further includes:

A resource allocation module (not shown) used for allocating the determined resources which may be used by the SU in the current period to the SU. Regardless of arrangement of the device at the SBS, the spectrum coordinator or the SU, the SU further comprises:

A resource use module (not shown) used for using resources of the primary network according to a prediction result of resources in the current period by the determination module, wherein if the prediction result shows network resources which may be used by the SU in the current period, the resource use module senses whether the resources are used by the PU, the SU uses resources not used by the PU in the resources and feeds back a use result. Thus, if the resource request in the current period fails (i.e. the requested resources are used by the PU), it shows that the situation that the PU uses the resources in the current period is inconsistent with the prediction result from the determination module. Therefore, such result may be fed back to a resource allocator in order to update use statuses in the management module, and if the SU requests resource collection independently, use statuses in the local management module may be updated, thus it is called result feedback and update.

The resource use module is used for receiving and sending information by utilizing wireless resources.

In addition, the device further comprises:

A control module (not shown) used for prohibiting resource prediction of the determination module 2 at a primary network status generation stage, wherein the control module may determine the ending of the primary network status generation stage and allow the prediction of the determination module 2 under the condition that the time length that the management module stores and updates the transformation situations of the use statuses of the network resources of the PU goes beyond a preset time threshold, or the number that the management module stores and updates the use statuses of the network resources of the PU goes beyond a preset number threshold.

The device of the present invention may predict use statuses of the PU for the primary network resources and allocate resources to the SU properly or guide the SU to acquire appropriate resources, so the device may be arranged in a network (for example, a database for storing the primary network use statuses) except the SBS or the SU. If the device is arranged at the SBS, the management module 1 and the primary network status collection module may be part thereof and are implemented by the existing equipment in the SBS. If the device is arranged at the SU, the management module 1 and the primary network status collection module may be part of SU terminal equipment, and store the primary network statuses (including transformation situations) by the existing storing function of the SU terminal equipment and collect the primary network statuses by the existing sensing functions of the SU terminal equipment. The SBS may collect use statuses of the network resources of the PU independently, or collect use statuses of the network resources of the PU with the aid of the SU or combination of the SU and the SBS as needed.

The management module 1 may represent the use statuses of the network resources of the PU and the transformation situations thereof in different manners, such as arrays, texts, pictures and the like. In one embodiment, the management module 1 may represent transformation situations of the use statuses of the network resources by directed arcs among the nodes, wherein each node represents a use status of the network resources of the PU in a time period, and each directed arc directs to a target node from a start node, representing a transformation of the use status of the network resources of the PU from a use status corresponding to the start node to a use status corresponding to the target node.

The management module 1 is further used for weighting the directed arcs and each node, wherein a weight of the directed arc represents the number of times of the transformations of the use status of the network resources from a use status corresponding to the start node of the directed arc to a use status corresponding to the target node of the directed arc, and the weight of the node represents the last status updating time of the use status corresponding to the node.

The determination module 2 may ignore nodes meeting the following requirements when predicting the resources in the current period, including target nodes to which directed arcs direct, wherein said directed arcs have weights less than a preset threshold in directed arcs taking nodes corresponding to the use statuses of the network resources in a period prior to the current period as start nodes, and nodes corresponding to use statuses not occurring in a preset time period.

Meanwhile, the management module 1 is further used for assigning a value to a node corresponding to each saved use status, wherein the value of each node represents transmission opportunities (TO) used and not used by the PU in the network resources.

In addition, the management module further simplifies the saved network statuses in a preset period or in accordance with the number of saved nodes.

At least one of the following simplified operations is included:

Merging a plurality of nodes with high similarity, and reassigning a value to the merged node, wherein transmission opportunities with difference in the aspect of use statuses among the use statuses corresponding to the plurality of nodes which are merged are marked with no allocation to the SU when being reassigned the values, and after being merged, the directed arcs connected with the plurality of nodes are coupled to the merged node, wherein the high similarity among the plurality of nodes means that use statuses of the transmission opportunities exceeding a preset threshold in the use statuses corresponding to the plurality of nodes are identical to each other; and the nodes which are merged meet the following requirement that the weights of the directed arcs coupled to the plurality of nodes are more than a preset weight threshold; and Deleting a node meeting one of the following requirements: the number of other nodes connected to the node is less than a preset number; the weights of the directed arcs connected to the node are less than a preset weight threshold; and the weight of the node represents no occurrence of the use status corresponding to the node in the preset time period.

Figure 2:
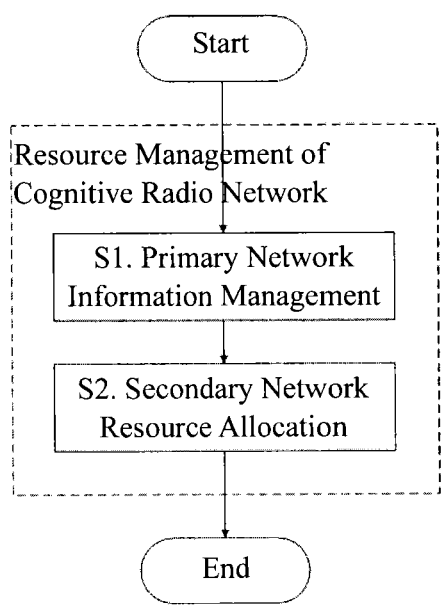
FIG. 2 is a flow diagram illustrating a resource management process of a cognitive radio network in a determination solution for network resource usage according to one embodiment of the invention.

Based on the above discussion, the resource management of the cognitive radio network provided by the invention comprises primary network information management and secondary network resource allocation, as shown in FIG. 2.

The following description for the technical solution of the invention is made.

Figure 3A:
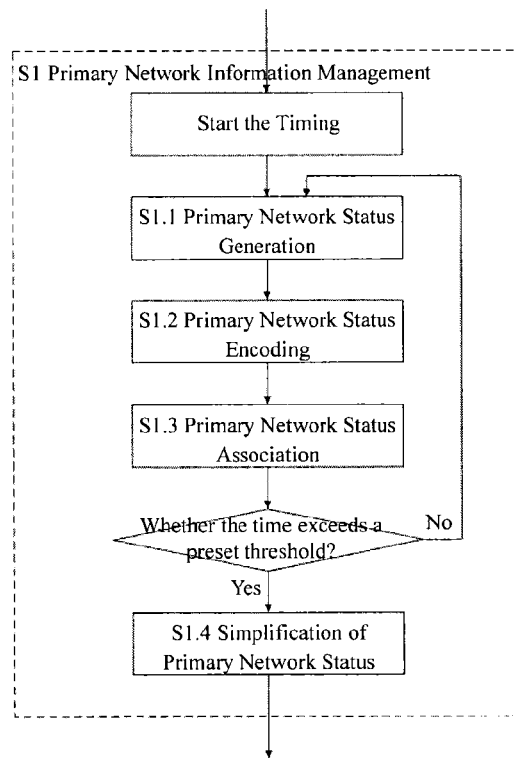
FIG. 3a is a flow diagram illustrating primary network information management performed by time control in a determination solution for network resource usage according to one embodiment of the invention.
Figure 3B:
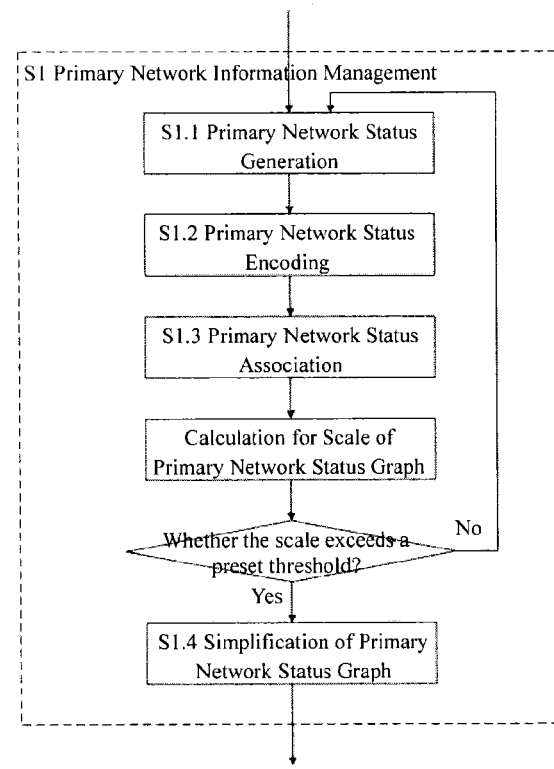
FIG. 3b is a flow diagram illustrating primary network information management performed by scale control in a determination solution for network resource usage according to one embodiment of the invention.

FIG. 2 proceeds to the step S1 of the primary network information management which means that the secondary network detects, stores and manages the primary network statuses and records the association among the primary network statuses in order to predict the coming resource use statuses of the primary network. Refer to FIGS. 3a and 3b, the management process mainly comprises primary network status generation, primary network status encoding, primary network status association and primary network status graph (PNSG) simplification. A PNSG will be generated in the above process, representing the association among the primary network statuses and the transformation process of the primary network statuses.

FIGS. 3a and 3b illustrates the simplification of the primary network statuses is controlled by the time and the node scale respectively.

Figure 4:
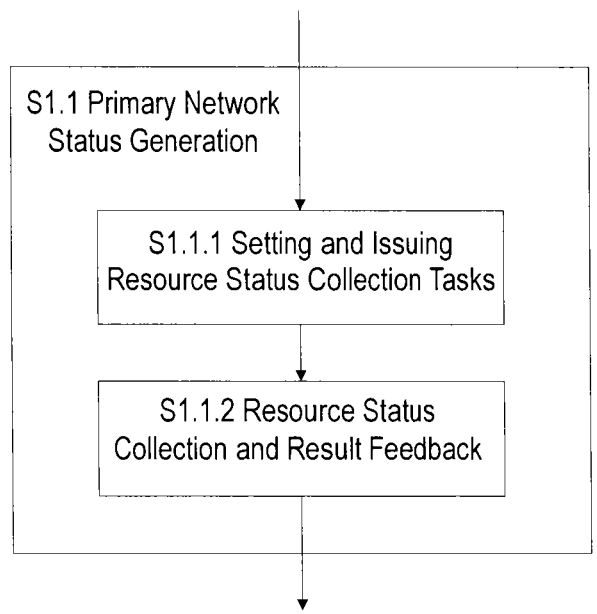
FIG. 4 is a flow diagram illustrating primary network status generation in a determination solution for network resource usage according to one embodiment of the invention.

FIGS. 3a and 3b provide the step S1.1 of the primary network status generation which means that the secondary network senses a frequency band corresponding to each TO in the licensed spectrums so as to detect whether the frequency band is used by a primary system, thereby generating a network status. For example, the OFDM network is discussed as the primary network as follows: the primary network comprises $N_{CH}$ channels, such as $CH_0, \ldots, CH_{N_{CH}-1}$. The timeline is divided based on time slot, the time variable is represented as $t \in [0 \ldots \infty]$. A TO includes a time slot of a channel, namely, a resource block, so the TO at the $t^{rd}$ time slot is marked as a channel designator (the channel designator and the TO number are identical in the later description). The secondary system senses and detects the channel corresponding to each resource block at each time slot to determine the resource block which is used by the primary system or is idle. Refer to FIG. 4, the primary network status generation further comprises two sub-steps of setting and issuing a resource status collection task, and collecting the resource statuses and feeding back a result.

The process of the primary network status generation in FIG. 4 mainly comprises steps S1.1.1 and S1.1.2.

The step S1.1.1 of setting and issuing of the resource status collection task is implemented by selecting one or one group of secondary network nodes to sense and detect the spectrums according to the sensing function of each node in the secondary network and the scope where the licensed spectrum of the primary network covers. Take an example, the SBS is selected as a spectrum sensing and detection node, and compressed sensing and other techniques are applied to broader frequency spectrums to decrease the sensing time and the calculated amount. Take another example, one group of SU is selected and coordinated to sense and detect the spectrums. Take further example, the SBS and one group of SU are selected and coordinated to sense and detect the spectrums.

The step S1.1.2 of resource status collection and result feedback shown in FIG. 4 is implemented by the secondary network node sensing the frequency band corresponding to each TO in the licensed spectrums according to the received resource status collection task in order to detect whether each frequency band is used by the primary system, and feeding back a detection result.

Refer to FIGS. 3a and 3b again, the step S1.2 of the primary network status encoding is implemented by encoding the primary network status by the secondary network to quantize the status for convenience to perform operations thereon. Specifically, a one-digital number represents a status value of a TO, for example, 1 represents occupancy by the primary network node, 0 represents idleness and 2 represents indeterminacy; and the TOs are sequenced based on the frequency bands thereof, and the status values of the TOs are sequentially arranged into a ternary number, that is, the primary network statuses are encoded. For example, if $N_{CH}=4$ and the use statuses of the four channels used by the primary system represent occupancy, occupancy, idleness, and occupancy, the network status is encoded as $1101_{(3)}$. The indeterminacy is set for merging the primary network statuses, wherein merging the plurality of statuses is based on a bit, that is, the same statuses are represented by original statuses, and the different statuses are represented by 2, for example, the network statuses $1010_{(3)}$ and $1011_{(3)}$ are merged into $1012_{(3)}$. The primary network statuses correspond to nodes in the PNSG respectively (therefore, the nodes in the PNSG and the primary network statuses are same throughout the description), which is represented by the encodings of the primary network statuses. Each node is assigned a node weight which records the time slot of the TO where the last operation (excluding the PNSG simplification) on the node occurred.

Figure 5A:
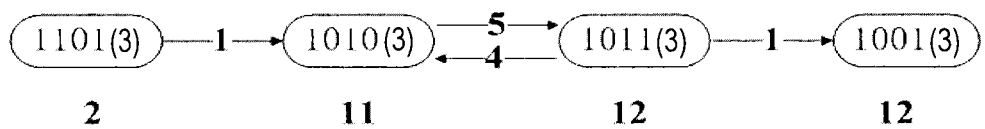
FIG. 5a is a schematic diagram illustrating an initial primary network status represented by a node and a directed arc in a determination solution for network resource usage according to one embodiment of the invention.

The step S1.3 of primary network status association shown in FIGS. 3a and 3b is implemented by associating the encoded primary networks statuses by the secondary network according to a transformation relationship, thereby recording the spatiotemporal association among the primary network statuses for predicting the coming primary network statuses. A directed arc is applied to associate the previous primary network status with the current primary network status. The previous primary network status is a tail node of the directed arc, and the current primary network status is a head node of the directed arc, which shows a transformation from the primary network status corresponding to the tail node to the primary network status corresponding to the head node. The head node is a succeeding node of the tail node, and the tail node is a preceding node of the head node. Each arc is assigned an arc weight representing the number of occurrence times of the arc. The arc weight has an initial value being 1, and the same arcs (arcs with the same tail node and head node) occur once, the arc weights will be increased by 1. FIG. 5a illustrates a primary network statue graph (PNSG) comprising four nodes, such as $1101_{(3)}$, $1010_{(3)}$, $1011_{(3)}$ and $1001_{(3)}$. The primary network status $1101_{(3)}$ is generated at the time slot 1, and one transformation from $1101_{(3)}$ to $1010_{(3)}$ occurs, so the arc weight from $1101_{(3)}$ to $1010_{(3)}$ is 1. The last operation on the primary network status $1101_{(3)}$ is to associated with $1010_{(3)}$, which occurs at the time slot 2, so the node weight of the primary network status $1101_{(3)}$ is 2.

The step S1.4 shown in the FIGS. 3a and 3b, ie. simplification of the primary network statuses: the primary network statuses continuously increases as the operation time of the network goes, which causes the complicated PNSG in two aspects of improving a demand for storage capacity and intensifying the calculated amount operated thereon. Therefore proper simplification for the PNSG is required. The simplification is activated by the time control as shown in FIG. 3a and the scale control as shown in FIG. 3b. In the FIG. 3a, the timing is started from accessing the primary network information management initially, and after the primary network status association ends, the timing result is compared with a preset time threshold. If the timing result exceeds the threshold, the PNSG simplification is activated. In FIG. 3b, the PNSG scale is calculated after the primary network status association ends. If the scale exceeds a preset threshold, the PNSG simplification is activated. The PNSG scale is represented by the number of nodes thereof. When the number of nodes exceeds a preset threshold, the scale is deemed to exceed the threshold. The PNSG simplification comprises status merging and status deletion.

The status merging means the plurality of associated primary network statuses with the higher similarity are emerged to form one node for replacing the plurality of unchanged nodes, so that the association between other nodes and the plurality of unchanged nodes is replaced for that between the other nodes and the new node. The emerged primary network statuses will meet the following requirements: firstly, the nodes form a directed group, that is, any two nodes are connected by a bidirectional arc to ensure the association therebetween; secondarily, the arc weight exceeds a threshold to ensure the higher possibility to transform the statuses corresponding to the nodes; and finally, the same statuses of each node in the group exceed a threshold to ensure the higher similarity among the statuses, thereby obtaining the more determinable statuses after merging operation. The status merging operation comprising: finding out a directed group by utilizing an existing graph-theoretical algorithm; comparing each arc weight with the preset threshold, and forming a new group by nodes connected by the arc exceeding the threshold; and selecting and merging nodes of which the proportion of the common statuses exceeds the preset threshold in the new group. The number of the nodes in the newest group is more than 1, showing the success of the merging operation, and failure otherwise. The emerged nodes replace the plurality of emerged nodes, and the association of nodes in the original PNSG with the emerged nodes is transformed to the association of nodes with the new node; and arcs between other nodes and the emerged nodes are replaced for arcs between other nodes and the new node; as well as the same arcs are replaced for one arc of which the weight is equal to the number of the same arcs. The node weight of the new node will be the maximal among the weights of the unchanged nodes, and weights of other nodes with re-association with the new node remain the same, thus completing the merging operation. The nodes $1010_{(3)}$ and $1011_{(3)}$ in FIG. 5a are emerged to obtain the node $1012_{(3)}$ in FIG. 5b.

Figure 5B:
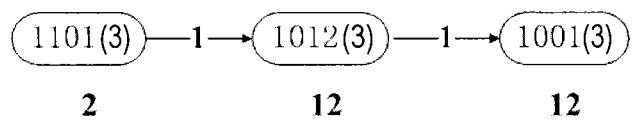
Figure 5C:
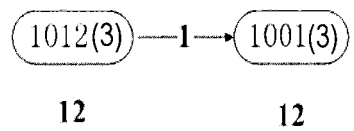
FIG. 5c is a schematic diagram illustrating a primary network status after deletion of primary network statuses shown in FIG. 5b.

The status deletion means that nodes having lower association with other nodes (including less associated nodes and connected by arcs with small arc weights) and long-time unchanged statuses (small node weights) are deleted from the PNSG. The status deletion comprises the following operation steps: finding out nodes which associate with one node merely in the PNSG; comparing the weights of the associated arcs with the nodes with an arc weight threshold, and if the weights of the associated arcs are less than the arc weight threshold, judging whether the weights of nodes are less than a node weight threshold; if the weights of the nodes are less than the node weight threshold, deleting the nodes and the arcs associated with the nodes and the weights thereof; and judging the two associated nodes until the PNSG scale meets the preset requirement. The node $1101_{(3)}$ in FIG. 5b is deleted to obtain a resource status graph shown in FIG. 5c.

Refer to FIG. 2 again, the step S2 of secondary network resource allocation is implemented by utilizing the generated PNSG to predict the incoming use conditions of the primary network for the licensed spectrums such that the licensed spectrum resources are allocated to the SU and the PNSG is updated in order to realize the effective utilization of the licensed spectrums. The method of allocation comprises the following two ways: (1) allocation is determined by the SU independently; and (2) the allocation is controlled by SBS centrally, as shown in FIGS. 6a and 6b respectively.

Figure 6A:
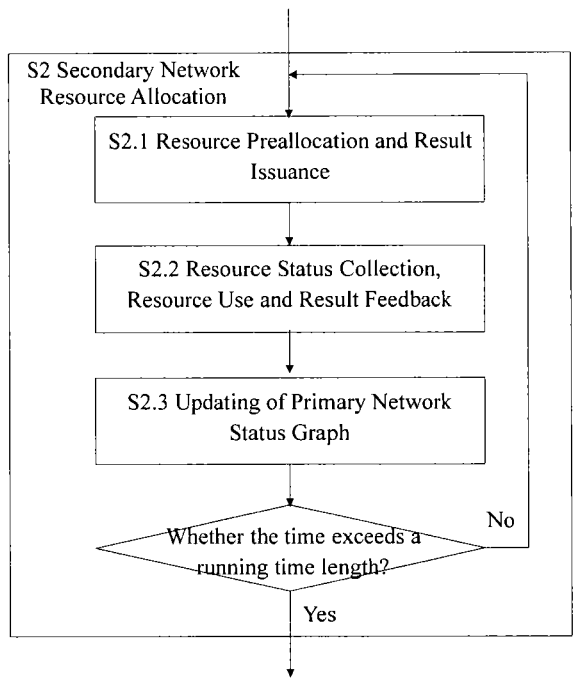
FIG. 6a is a flow diagram illustrating resource allocation determined by a SU according to one embodiment of the invention.
Figure 6B:
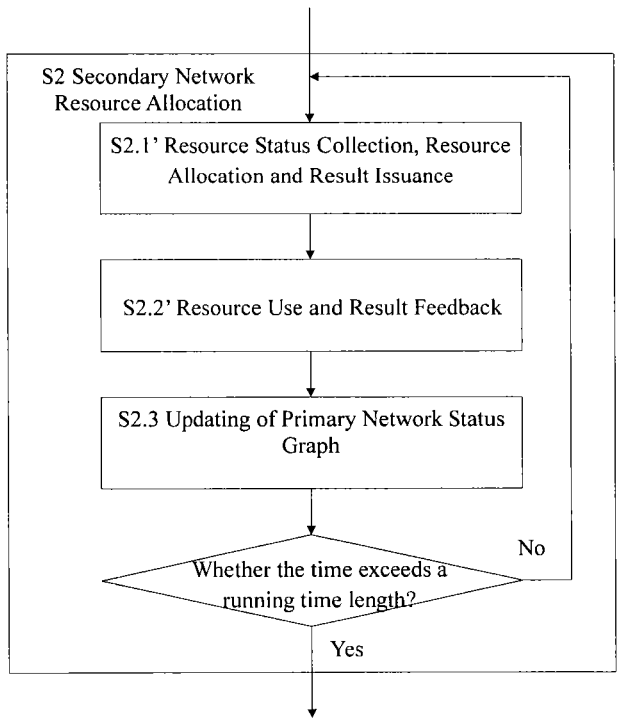
FIG. 6b is a flow diagram illustrating resource allocation controlled by a SBS centrally according to one embodiment of the invention.

FIG. 6a illustrates a flow of secondary network resource allocation under the allocation determined by the SU independently. As shown in FIG. 6a, where the allocation determined by the SU independently is implemented by the secondary network preallocating the resources according to the generated PNSG and issuing a preallocation result to the secondary network nodes. The secondary network nodes acquire the resource statuses according to the preallcoation result to determine whether the resources are used. Specifically, the secondary network preallocates the resources by using the generated PNSG and issues the preallocation result; the secondary network nodes collect the resource statuses, use the resources and feed back a use result according to the preallocation result; and the secondary network updates the PNSG according to the use result. The above operations are repeated until the secondary network ends. The specific operations are explained with respect to the steps 2.1-2.3.

Figure 7:
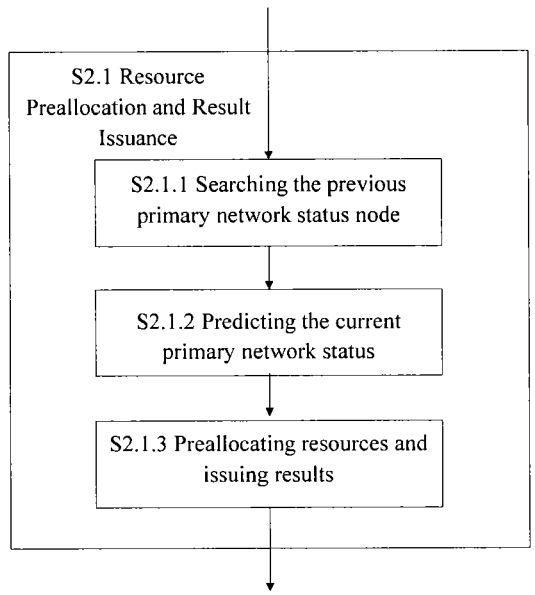
FIG. 7 is a flow diagram illustrating resource pre-allocation and result issuance in a determination solution for network resource usage according to one embodiment of the invention.

FIG. 7 is a flow diagram illustrating resource allocation and result issuance according to one embodiments of the invention.

FIG. 7 includes the following steps:

In the step S2.1 of resource allocation and result issuance, searching the previous primary network status nodes, predicting the current primary network status, and allocating resources and issuing an allocation result are comprised.

The step S2.1.1 of searching the previous primary networks status nodes is such described that the previous primary network status is the last ended primary network status, i.e., a history status, which has been added to the PNSG previously. The searching step can be accelerated by two ways. Specifically, since each node was assigned a node weight representing the time slot where the last operation thereon occurred, and the previous primary network status has the maximal node weight (the previous primary networks status is determined according to the maximal node weight); and a node can be determined immediately by setting a special field in the PNSG to direct to the previous primary network status.

The step S2.1.2 of predicting the current primary network status is such described that the current primary network status is a primary network status which will start at the current time, which is to be predicted due to its nonoccurrence. The prediction is based on the similarity for the transformation of the primary network statuses in the same environment. Therefore, the prediction for the transformation of the current primary network statuses is implemented by determining the previous primary network status node and the succeeding nodes thereof. When there is only one succeeding node, the status of the succeeding node is considered as a prediction result of the current primary network status. When there is more than one succeeding nodes, the succeeding nodes are selected completely or partially and merged to obtain a prediction result of the current primary network status. The nodes are classified into different levels based on the node weight, the bigger the weight is the higher the level is. The arc between each node and the previous primary network status node has an arc weight, and different arc weight thresholds are set for the nodes at different levels, the higher the level is the smaller the arc weight is. A method for selecting a part of the nodes includes the following steps: determining the level of each node; and finding out the corresponding arc weight threshold, wherein the nodes having the arc weights more than the respective thresholds may be selected as a prediction node set. Such method may show higher possibility that the last status transformation and the most frequent status transformation may occur again. The prediction node set is determined and then all the nodes therein are emerged to obtain a prediction result of the current primary network statuses. When there is no succeeding node, values of all status bits are deemed indeterminacy, i.e. 2.

The step S2.1.3 of resource preallocation and result issuance is such described that a prediction result of the current primary network status is a ternary number, wherein each bit represents predictions for the use condition that the frequency bands corresponding to the TOs are used by the primary network nodes. For example, 0 represents an unused situation, 2 represents indeterminacy and 1 represents a used situation. Accordingly, the TOs may be classified into three types as follows: 0 representing that the corresponding frequency band can be used by the secondary network nodes, 1 representing that the corresponding frequency band can not be used by the secondary network nodes, 2 representing that it can not be determined whether the corresponding frequency band can be used by the secondary network nodes. The secondary network nodes are arranged based on service priority from high to low, and are allocated the resources in sequence, specifically, selecting the first secondary network nodes, observing the TOs with status values being 0, 2 and 1 in sequence, and selecting and allocating one of the TOs with the same status values randomly to the secondary network node, or according to the history information on the successful transmissions of the secondary network node by the TO, preferably selecting the TO with the maximal times of the successful transmissions until a TO is selected for the secondary network node; and deleting the secondary network node and the TO a list, and considering the remaining secondary network nodes and TOs in sequence until the TOs are allocated to all the secondary network nodes, or all the TOs are used by the secondary network nodes. Allocation results, namely, the TO number, are sent to the corresponding secondary network nodes.

Figure 8:
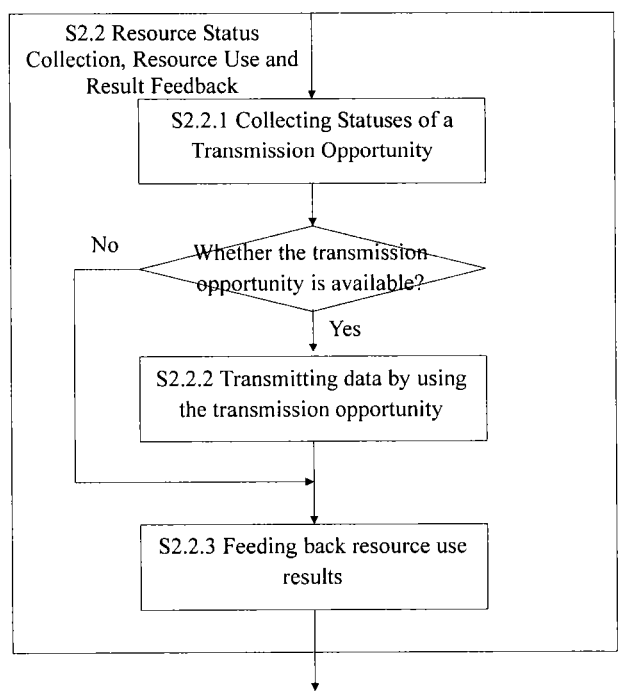
FIG. 8 is a flow diagram illustrating resource status collection, resource use and result feedback in a determination solution for network resource usage according to one embodiment of the invention.

The step S2.2 shown in FIG. 6a comprises resource status collection, resource use and result feedback (see FIG. 8 for details). The processes of the step S2.2 are as follows: S2.2.1, acquiring statuses of the TOs allocated to the secondary network nodes, i.e., sensing the frequency bands corresponding to the TOs, and executing the step S2.2.2 of transmitting data by the TOs if the sensing result shows the TOs are available (idle); and abandoning the use of the TOs if the sensing result shows that the TOs are not available (used by the primary system nodes); and executing the step S2.2.3 of feeding back the result that whether the secondary network node transmits the data successfully by applying the allocated TOs.

Furthermore, the step S2.3 of updating the PNSG in FIG. 6a: the secondary network receives a use result of the secondary network node for the TO to obtain the primary network status at the current TO, wherein the status of the successful transmission shows 0, the status of the transmission failure shows 1, and the status of the unused TO shows 2. The node is searched in the PNSG, if the node exists and the previous primary network status node and the node are connected by an arc with the previous primary network status node, the arc weight is increased by 1; if the node exists and there is no arc connection between the previous primary network status node and the node, an arc is generated and assigned an arc weight 1; if the node does not exist, a node is generated, with which the previous primary network node is associated by an arc which is assigned an arc weight 1. Node weights of the previous primary network status node and the node are amended to the current time slot. If a special field directing to the previous primary network status is set in the PNSG, the field directs to the current primary network status node.

Refer to FIG. 6b, the allocation controlled by the SBS centrally is explained in the following description. The SBS allocates the resources and issues an allocation result to the SU according to the generated PNSG, and the SU uses the allocated resources directly to transmit data. Specifically, the secondary network uses the generated PNSG to collect the resource statuses, allocates the resources and issues the result; the secondary network nodes use the allocated resources and feed back a use result; and the secondary network updates the PNSG according the use result. The above operations are repeated until the secondary network ends.

Figure 9:
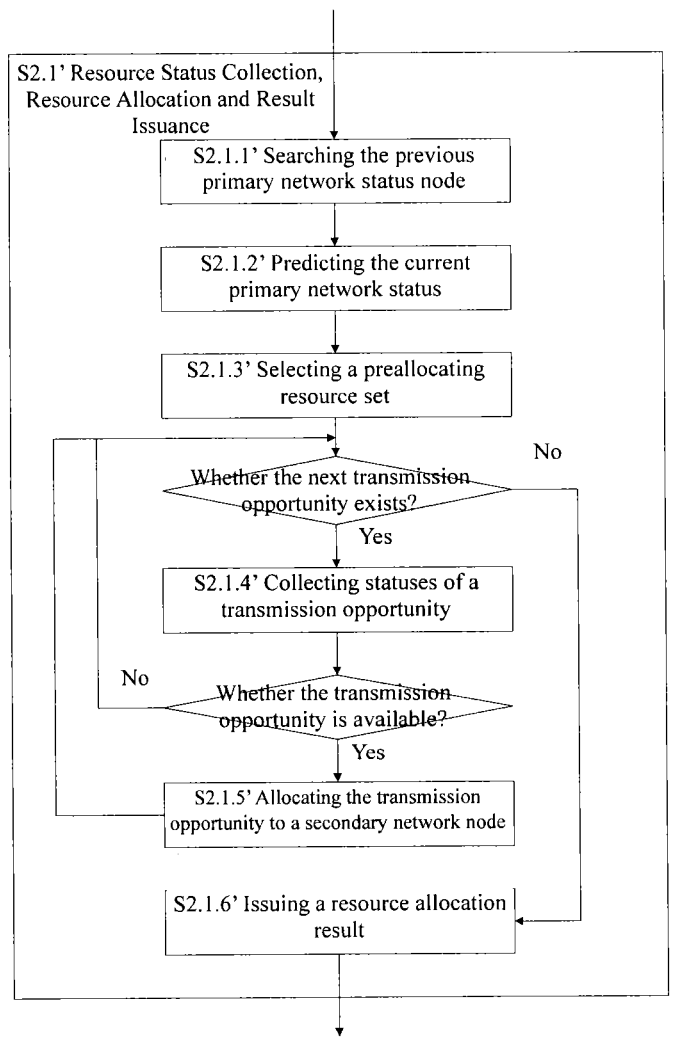
FIG. 9 is a flow diagram illustrating resource status collection, resource use and result feedback of another example in a determination solution for network resource usage according to one embodiment of the invention.

FIG. 6b comprises the following steps:

The step S2.1' of resource status collection, resource allocation and result issuance specifically comprises (see FIG. 9): searching the previous primary network status node, predicting the current primary network status, selecting a preallocated resource set, selecting one unobserved TO in the set, and collecting the status of the unobserved TO; if the TO is idle, allocating TO to the secondary network node, otherwise, selecting the next TO; and if no unobserved TO is contained in the preallocated resource set, issuing a resource allocation result. The operations of searching the previous primary network status node and predicting the current primary network status are identical to those of the steps S2.1.1 and S2.1.2 in the step S2.1 and hence are not discussed in further detail herein to avoid repetition.

The step S2.1.3' of selecting a preallocated resource set comprises: showing a prediction result of the current primary network status as a ternary number, wherein each bit represents predictions for the use conditions that the frequency bands corresponding to the TOs are used by the primary network nodes. For example, 0 represents an unused situation, 2 represents indeterminacy and 1 represents a used situation. Accordingly, the TOs may be classified into three types as follow: 0 representing that the corresponding frequency band can be used by the secondary network nodes, 1 representing that the corresponding frequency band can not be used by the secondary network nodes, 2 representing that it can not be determined whether the corresponding frequency band can be used by the secondary network nodes. The TOs with the status values being 0, 2 and 1 are observed in sequence. The preallocated resource set is formed according to the TOs which may be processed by the selected secondary network nodes at the resource allocation stage.

The step S2.2' of resource use and result feedback is such described that the secondary network nodes use the allocated TOs to transmit the data, and feed back the result whether the data transmission is successful.

The step S2.3' of updating the PNSG is identical to the step S2.3 in FIG. 6a and hence is not discussed in further detail herein to avoid repetition.

Figure 10:
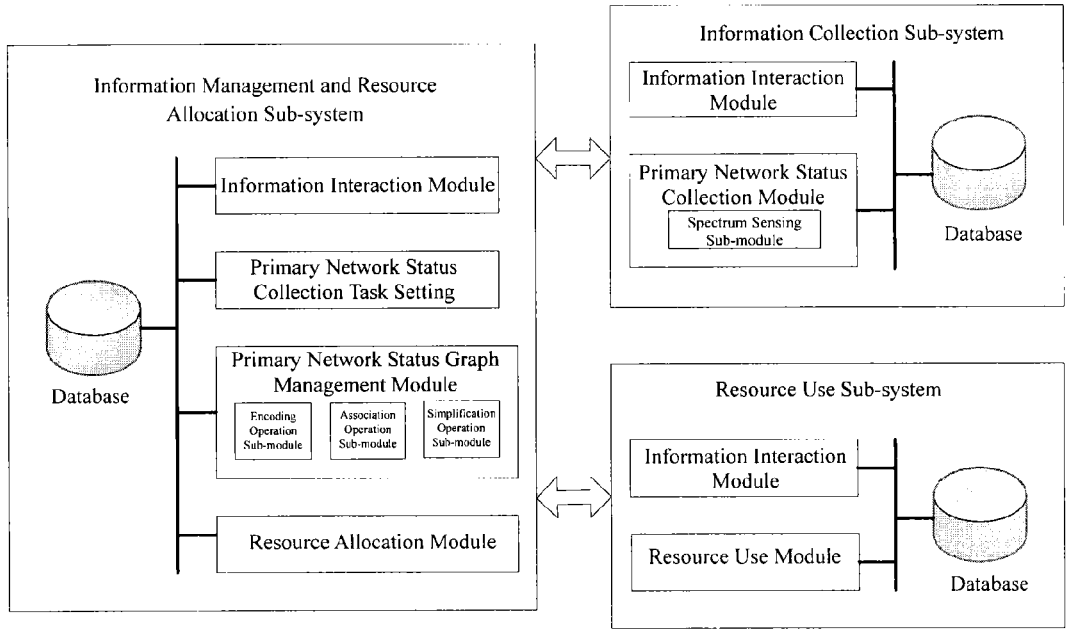
FIG. 10 is a structural diagram illustrating a resource management system of a cognitive radio network according to one embodiment of the invention.

Refer to FIG. 10, a resource management system of a cognitive radio network includes an information management and resource allocation sub-system, an information collection sub-system and a resource use sub-system.

The information management and resource allocation sub-system includes an information interaction module, a primary network status collection task setting module, a PNSG management module, a resource allocation module and a database. The information management and resource allocation sub-system may be arranged in a SBS or a spectrum coordinator. The information is interacted among the modules connected by the buses. The functions of the modules are explained in detail in the following description. The information interaction module is used for performing information interaction between the information management and resource allocation sub-system and the secondary network nodes, and sending resource allocation results to the SUs and receiving resource use results from the SUs, wherein the information interaction comprises sending resource status information collection tasks to the secondary network nodes, and receiving resource status information collection results from the secondary network nodes. The primary network status collection task setting module is used for setting primary network status collection tasks. The PNSG management module is used for generating and maintaining the operations of the PNSG, and comprises an encoding operation sub-module for encoding the primary network statuses, an association operation sub-module for associating the primary network statuses and a simplification operation sub-module for simplifying the PNSG. The resource allocation module is used for allocating the resources to the SUs. The database is used for storing intermediate and final results required for implementing the above functions of the modules. The PNSG management module and the database form the management module 1 shown in FIG. 1.

The information collection sub-system includes an information interaction module, a primary network status collection module and a database, and may be arranged in the SBS or the SU. The information interaction is performed among the modules connected by buses. The functions of the modules are explained in detail in the following description. The information interaction module is used for performing information interaction between the information collection sub-system and the secondary network nodes, wherein the information interaction comprises receiving resource status information collection tasks from the information management and resource allocation sub-system, and sending resource status information collection results to the information management and resource allocation sub-system. The primary network status collection module is used for collecting primary network statuses and comprises a spectrum sensing sub-module for sensing spectrums of the frequency bands corresponding to the TOs and acquiring sensing results. The database is used for storing intermediate and final results required for implementing the above functions of the modules.

The resource use sub-system includes an information interaction module, a resource use module and a database, and may be arranged in the SBS or SU. The information interaction is implemented among the modules connected by the buses. The functions of the modules will be explained in detail in the following description. The information interaction module is used for performing information interaction between the resource use sub-system and the secondary network nodes, wherein the information interaction comprises sending resource use results to the information management and resource allocation sub-system and receiving resource allocation results from the information management and resource allocation sub-system. The resource use module is used for receiving and sending the data. The database is used for storing intermediate and final results required for implementing the above functions of the modules.

Figure 11:
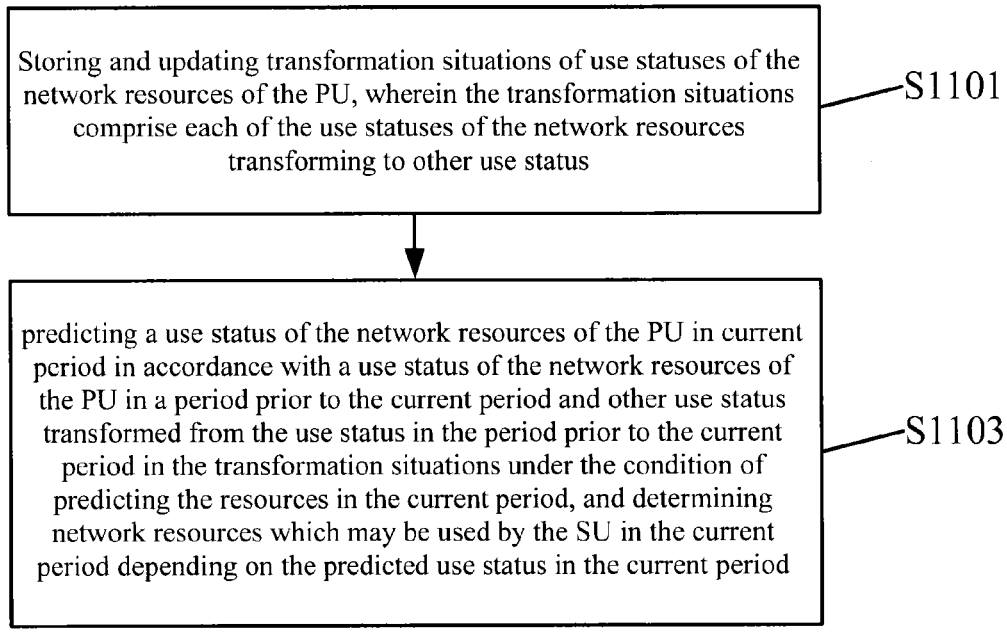
FIG. 11 a flow diagram illustrating a determination method for network resource usage according to one embodiment of the invention.

The information interaction among the sub-systems is implemented by the information interaction modules which are in wired connection or wireless connection selectively according to the position where each system is arranged. For example, the information interaction modules between the information management and resource allocation sub-system and the information collection sub-system arranged in the SBS are connected by the buses, while the data interaction is performed between the resource use sub-system arranged in the secondary user node and the information management and resource allocation sub-system and the information collection sub-system in the wireless connection. The information interaction modules between both the information collection sub-system and the resource use sub-system arranged in the secondary user node are connected by the buses, while the data interaction is performed between the above two sub-systems and the information management and resource allocation sub-system which is arranged in the SBS in the wireless connection FIG. 11 illustrates a determination method for network resource usage according to the embodiments of the invention, comprising:

Step S1101, storing and updating transformation situations of use statuses of the network resources of the PU, wherein the transformation situations comprise each of the use statuses of the network resources transforming to other use status; and Step S1103, predicting a use status of the network resources of the PU in current period in accordance with a use status of the network resources of the PU in a period prior to the current period and other use status transformed from the use status in the period prior to the current period in the transformation situations under the condition of predicting the resources in the current period, and determining network resources which may be used by the SU in the current period (called a determination result) depending on the predicted use status in the current period.

The determination method further comprises the steps of: collecting the use status of the network resources of the primary user; and acquiring and storing a collection result from a primary network status collection module.

The SBS may obtain the determination result and allocates the resources to the SUs according to the determined network resources which may be used thereby in the current period in a circumstance that the base station allocates the resources centrally.

Or, the SUs may request the independently determinate network resources which may be used thereby in the current period if the SBS fails to control and allocate the resources centrally, thus obtaining the determination result. The SUs use the network resources according to the determination result. If the prediction result shows the network resources which may be used by the SUs in the current period, the SUs sense whether the resources are used by the PUs, and then use resources not used by the PUs in the sensed resources and feed back use results.

The determination method further comprises the steps of: storing and updating the number of times of each use status transforming to other use statuses, and representing transformation situations of the use statuses of the network resources by establishing associations among the use statuses, wherein an association of each use status with another use status comprises the use status transforming to other use status and the number of times thereof.

The determination method further comprises the steps of: storing and updating the last status updating time of each use status, and filtering second use statuses associated with first use statuses of the network resources in a period prior to the current period in the stored transformation situations under the condition of predicting the resources in the current period, wherein the second use statuses associated with the first use statuses refer to the second use statuses being transformed from the first use statuses, and in the process of filtering, the second use statuses with a degree of association less than a preset threshold and/or not occurring in a preset time period are filtered out; and network resources allocated to the secondary user are determined according to the remaining use statuses, wherein the degree of association of the second use statuses with the first use statuses is less than the preset threshold, which means occurrence of M transformations from the first use statuses to the second use statuses, M is less than the preset threshold.

The use status comprises a use condition of each transmission opportunity in the network resources by the primary user.

In the method, directed arcs among the nodes may represent transformation situations of the use statuses for the network resources, wherein each node represents a use status of the network resources of the PU at a time, each directed arc directs to a target node from a start node, representing a transformation of a use status of the network resources of the PU from a use status corresponding to the start node to a use status corresponding to the target node.

Besides, weights are assigned to the directed arcs and a node weight is also assigned to each node, wherein the weight of one directed arc represents the number of times of transformations of the use status for the network resources from a use status corresponding to the start node of the directed arc to a use status corresponding to the target node thereof, and the node weight represents the last updating time of the use status corresponding to the node.

Nodes meeting the following requirements may be ignored when the network resources which may be used by the SU are determined in the current period, including target nodes to which directed arcs direct, wherein said directed arcs have weights less than a preset threshold in directed arcs taking nodes corresponding to the use statuses of the network resources in a period prior to the current period as start nodes, and nodes corresponding to use statuses not occurring in a preset time period.

A weight is assigned to a node corresponding to each saved use status, wherein the weight of each node represents the TOs used and not used by the primary user in the network resources.

Furthermore, the method further comprises the step of simplifying the saved network statuses in a preset period or according to the saved number of nodes, wherein at least one of following simplified operations is comprised: merging a plurality of nodes with high similarity to obtain a merged node and reassigning a weight to the merged node, wherein TOs with different use statuses in use statuses corresponding to the plurality of nodes which are merged are marked with no allocation to the SUs when being reassigned the weights; and then coupling the directed arcs connected with the plurality of nodes to the merged node, wherein the high similarity of the plurality of nodes means that use statuses of the TOs exceeding the preset number threshold in the use statuses corresponding to the plurality of nodes are identical; and the nodes which are merged meet the following requirements: the weights of the directed arcs connected to the plurality of nodes are more than the preset weight threshold; and Nodes meeting one of the following requirements are deleted: the number of other nodes connected to the nodes is less than the preset number; the weights of the directed arcs connected to the nodes are less than the preset weight threshold; and the node weights of the nodes represent no occurrence of use statuses corresponding to the nodes in the preset time period.

From the above, in the technical solution of the invention, the use statuses of the network resources of the PU and the transformation situations of the use statuses are stored, the use statuses of the network resources of the PU in the current period may be predicted based on the stored transformation situations of the use statuses, so that resources which may be used by the SU in the current period may be determined in advance, the time of sensing to the PU for interference suppression is decreased effectively, thereby prejudging the resource allocation/request reasonably and overcoming the hysteresis of the SU using the resources. In addition, the invention also provides the concept of the network status graph which is formed by generating, encoding and associating the network statuses (i.e. resource use status information of the primary network) and used for recording the association of the use statuses of the licensed spectrums in the spatiotemporal pattern and preferably predicting the availability of the licensed spectrums for the SUs, thereby improving the use efficiency of the licensed spectrums. Moreover, in the invention, the simplification of the network status graph may be implemented by merging and deleting the networks status nodes therein, with reduction of the overhead of storage space of the network status graph and acceleration of calculation of the possibility for predicting the licensed spectrums for the SUs.

The basic principles of the invention is discussed with respect to the embodiments, however, it is noted that those skilled in the art should appreciate from the invention all or any of the steps or features of the method and device of the invention and may implement the same in any calculating device (such as processor, storage medium, etc.) or calculating device network by hardware, firmware, software or the combination thereof by applying their basic programming skills.

Therefore, the invention may be implemented by running a program or one group of programs in any calculating device. The calculating device may be the publicly known device. The invention may be implemented by merely providing a program product containing program codes for realizing the method or device. In other words, such program product constitutes the invention, and a storage medium storing such program product also constitutes the invention. Obviously, the storage medium may be any storage medium which is well known or will be developed in the future.

Figure 12:
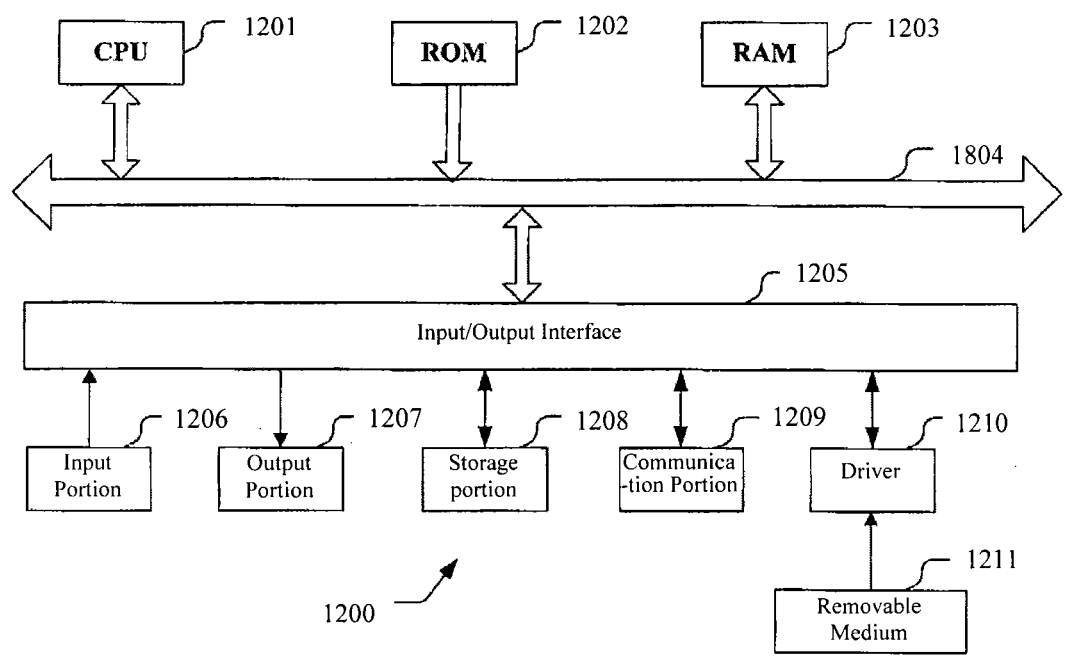
FIG. 12 is a structural diagram of a computer for implementing the technical solution of the invention.

In a circumstance that the embodiments of the invention are realized by software and/or firmware, program constituting the software are installed in a computer with a special hardware structure, for example, a general-purpose computer 1200 shown in FIG. 12, by the storage medium or network. The computer equipped with the program can run different functions.

Refer to FIG. 12, a central processing unit (CPU) 1201 executes different operations according to program stored in a read-only memory (ROM) 1202 or program loaded in a random access memory (RAM) 1203 from a storage portion 1208. The RAM 1203 also stores data required for the different operations executed by the CPU 1201. The CPU 1201, the ROM 1202 and the RAM 1203 are connected mutually by a bus 1204. An input/output interface 1205 is also connected to the bus 1204.

An input portion 1206 including a keyboard, a mouse and the like, an output portion 1207 including a display (such as a cathode-ray tube (CRT) display, a liquid-crystal display (LCD) and the like) and a loudspeaker, etc., the storage portion 1208 including a hard disk, etc. and a communication portion 1209 including a network interface card such as an LAN card and a modulator-demodulator, etc. are connected to the input/output interface 1205. The communication portion 1209 runs a communication operation by a network such as Internet.

A driver 1210 is connected to the input/output interface 1205 as needed. A removable medium 1211 such as a disc, an optical disc, a magnetic optical disc, a semiconductor memory and the like are installed in the driver 1210 as needed, such that computer program read from the driver 1210 are installed in the storage portion 1208 as needed.

When the software is used to realize the processing operations, program constituting the software are installed by the network such as Internet or the storage medium such as the removable medium 1211.

Those skilled in the art should understand that the storage medium includes, but not limited to, the removable medium 1211 storing the program and providing program for users in separation from the device, shown in FIG. 12. The removable medium 1211 includes a disc (including a floppy disk (registered trademark)), an optical disc (including a compact disk read only memory (CD-ROM) and a digital video disk (DVD)), a magnetic optical disc (including minidisc (MD) (registered trademark)) and a semiconductor memory. Or the storage medium may be discs and the like included in the ROM 1202 and the storage portion 1208, wherein the discs stores program and are distributed to the users with the devices containing the same.

It is should be noted that the features or steps can be split and/or recombined in the device and method of the invention. Such splitting and/or recombination are deemed to be equivalent. Moreover, the steps can be performed in time order described naturally, but they are not necessarily required. Some steps can be performed in parallel or independently.

Although the invention and key points thereof have been described in detail, it should be understood that various changes, substitutions and alterations can be made herein without departing from the spirit and scope of the invention. Moreover, the terms, such as 'comprise', 'composed of' or other nonexclusive derivatives are used in the invention, such that the process, method, product or device comprises not only a series of factors but also other factors not described definitely, or inherent factors thereof. Without more limitations, the wording 'comprising one . . . ' defines one factor, but may comprise other same factors in the process, method, product or device.

The invention claimed is:

1. A determination device for network resource usage, wherein the determination device for network resource usage is used for determining network resources which may be used by a secondary user in a cognitive radio network, and includes:
   a management module used for storing and updating transformation situations of use statuses of the network resources of a primary user, wherein the transformation situations comprise each of the use statuses of the network resources transforming to other use status; and
   a determination module used for predicting a use status of the network resources of the primary user in current period in accordance with a use status of the network resources of the primary user in a period prior to the current period and other use status transformed from the use status in the period prior to the current period in the transformation situations under the condition of predicting the resources in the current period, and determining network resources which may be used by a secondary user in the current period depending on the predicted use status in the current period.

2. The determination device of claim 1, wherein, when the determination device is arranged at a secondary base station or a spectrum coordinator, the determination device further includes a primary network status collection task setting module which is used for allocating a network resource use status collection task so as to collect use statuses of the network resources of the primary user by network equipment or a secondary user which receives a network resource use status collection task; and the management module is used for acquiring and storing a collection result from the network equipment or secondary user.

3. The determination device of claim 1, wherein, when the determination device is arranged at a secondary base station or spectrum coordinator, the determination device further includes a resource allocation module which is used for allocating resources to the secondary user in accordance with the determined network resources which may be used by the secondary user in the current period.

4. The determination device of claim 1, wherein the determination device further includes a primary network status collection module which is used for collecting a use status of the network resources of the primary user; and the management module is used for acquiring and storing a collection result from the primary network status collection module.

5. The determination device of claim 1, wherein the management module further stores and updates the number of times of each status transforming to other use statuses, and represents transformation situations of the use statuses of the network resources by establishing associations among the use statuses, wherein an association of each use status with another use status comprises the transformations of the use status to the other use status and the number of times thereof.

6. The determination device of claim 5, wherein the management module further stores and updates the last status updating time of each use status; and the determination module is used for filtering second use statuses associated with first use statuses of the network resources in a period prior to the current period in the stored transformation situations under the condition of predicting the resources in the current period, wherein second use statuses associated with first use statuses refer to the second use statuses being transformed from the first use statuses, and in the process of filtering, the second use statuses with a degree of association less than a preset threshold and/or not occurring in a preset time period are filtered out; and network resources allocated to the secondary user are determined according to the remaining use statuses, wherein the degree of association of the second use statuses with the first use statuses is less than the preset threshold, which means occurrence of M transformations from the first use statuses to the second use statuses, M is less than the preset threshold.

7. The determination device of claim 1, wherein, when the determination device is arranged at a secondary user, the determination device further includes a resource use module which is used for using primary network resources according to a prediction result predicted by the determination module in the current period, and wherein, when the prediction result shows network resources which may be used by the secondary user in the current period, the resource use module senses whether the resources are used by the primary user, and uses resources not used by the primary user in the resources and feeds back a use result.

8. The determination device of claim 1, wherein the use status comprises a use condition of each transmission opportunity in the network resources by the primary user.

9. A determination method for network resource usage, wherein the determination method for network resource usage is used for determining network resources which may be used by a secondary user in a cognitive radio network, and comprises the steps of:
   storing and updating transformation situations of use statuses of the network resources of a primary user, wherein the transformation situations comprise each of the use statuses of the network resources transforming to other use status; and
   predicting a use status of the network resources of the primary user in current period in accordance with a use status of the network resources of the primary user in a period prior to the current period and other use status transformed from the use status in the period prior to the current period in the transformation situations under the condition of predicting the resources in the current period, and determining a network resource which may be used by a secondary user in the current period depending on the predicted use status in the current period.

10. The determination method of claim 9, wherein the determination method further comprises the steps of:
- collecting the use status of the network resources of the primary user; and
- acquiring and storing a collection result from a primary network status collection module.

11. The determination method of claim 9, wherein the determination method further comprises the step of allocating resources to the secondary user in accordance with the determined network resources which may be used by the secondary user in the current period.

12. The determination method of claim 9, wherein the determination method further comprises the step of using network resources by a secondary user in accordance with the determined network resources which may be used by the secondary user in current period, and wherein, when a prediction result shows the network resources which may be used by the secondary user in the current period, the secondary user senses whether the resources are used by the primary user, and uses resources not used by the primary user in the resources and feeds back a use result.

13. The determination method of claim 9, wherein the determination method further comprises the steps of:
- storing and updating the number of times of each status transforming to other use statuses, and representing transformation situations of the use statuses of the network resources by establishing associations among the use statuses, wherein an association of each use status with another use status comprises transformations of each use status to the other use status and the number of times thereof.

14. The determination method of claim 9, wherein the determination method further comprises the steps of:
- storing and updating the last status updating time of each use status, and filtering second use statuses associated with first use statuses of the network resources in a period prior to the current period in the stored transformation situations under the condition of predicting the resources in the current period, wherein second use statuses associated with first use statuses refer to the second use statuses being transformed from the first use statuses, and in the process of filtering, the second use statuses with a degree of association less than a preset threshold and/or not occurring in a preset time period are filtered out; and network resources allocated to the secondary user are determined according to the remaining use statuses, wherein the degree of association of the second use statuses with the first use statuses is less than the preset threshold, which means occurrence of M transformations from the first use statuses to the second use statuses, M is less than the preset threshold.

15. The determination method of claim 9, wherein the use status comprises a use condition of each transmission opportunity in the network resources by the primary user.

16. A non-transient storage medium, having embodied thereon a computer program configured to cause a processor to implement a determination technique for network resource usage, the computer program comprising code segments configured to cause a processor to:
- storing and updating transformation situations of use statuses of the network resources of a primary user, wherein the transformation situations comprise each of the use statuses of the network resources transforming to other use status; and
- predicting a use status of the network resources of the primary user in current period in accordance with a use status of the network resources of the primary user in a period prior to the current period and other use status transformed from the use status in the period prior to the current period in the transformation situations under the condition of predicting the resources in the current period, and determining a network resource which may be used by a secondary user in the current period depending on the predicted use status in the current period.

* * * * *